United States Patent [19]

Nakamura et al.

[11] Patent Number: 5,255,752
[45] Date of Patent: Oct. 26, 1993

[54] BODY FRAME STRUCTURE FOR CRAWLER TYPE WORKING VEHICLE

[75] Inventors: Norimi Nakamura; Mitsugu Kobayashi; Akio Matsui; Tetsuo Yamaguchi, all of Sakai, Japan

[73] Assignee: Kubota Corporation, Osaka, Japan

[21] Appl. No.: 756,071

[22] Filed: Sep. 6, 1991

[30] Foreign Application Priority Data

Sep. 12, 1990 [JP] Japan .................. 2-243641

[51] Int. Cl.$^5$ .................................... B62D 11/02
[52] U.S. Cl. ............................. 180/6.7; 180/311; 180/291; 280/782
[58] Field of Search ............. 180/6.2, 6.7, 311, 312, 180/291, 184; 280/830, 831, 782; 296/204

[56] References Cited

U.S. PATENT DOCUMENTS

| | | | |
|---|---|---|---|
| 1,299,937 | 4/1919 | Hatfield | 180/6.7 |
| 1,348,558 | 5/1920 | Garner et al. | 180/6.7 |
| 2,667,231 | 1/1954 | MacPherson | 180/291 |
| 3,869,017 | 3/1975 | Feustel et al. | 180/291 X |
| 4,363,374 | 12/1982 | Richter et al. | 280/43 |
| 4,506,756 | 3/1985 | Bergous | 280/831 X |

FOREIGN PATENT DOCUMENTS 23736  11/1905  United Kingdom ............. 180/6.7

Primary Examiner—Margaret A. Focarino
Assistant Examiner—Florian Zeender
Attorney, Agent, or Firm—Webb, Burden, Ziesenheim & Webb

[57] ABSTRACT

A frame structure for a working vehicle having crawler running devices includes main frames extending longitudinally along right and left sides of a vehicle body. The crawler running devices have track frames extending below and along the main frames, respectively. An oil tank is disposed between the main frames for rigidly interconnecting forward positions of the main frames and rigidly interconnecting the track frames. The frame structure includes an engine supporting frame for supporting an engine rearwardly of the oil tank. The engine supporting frame is connected to the oil tank through a reinforcing beam, and is curved downwardly with an intermediate portion thereof lying substantially level with the bottom of the oil tank.

11 Claims, 5 Drawing Sheets

BODY FRAME STRUCTURE FOR CRAWLER TYPE WORKING VEHICLE

BACKGROUND OF THE INVENTION

1. Field of the Invention

The present invention relates to a body frame structure for a working vehicle having right and left crawler running devices, with a working implement connected to the front of body frames and an engine mounted on a rear portion thereof.

2. Description of the Related Art

In a conventional body frame structure as noted above, the right and left crawler running devices have track frames secured to the body frames extending along upper positions of the crawler running devices, and the engine and an oil tank are mounted on the body frames. A working vehicle having such a frame structure is designed to have a space between the right and left crawler running devices located at a high level above the ground, to avoid the vehicle body becoming bogged down in the mud when running over a wet field or other unleveled grounds. Since the body frames lie at a high level above the ground and heavy components are mounted on the body, the vehicle has an elevated center of gravity. The elevated center of gravity brings about a serious problem of reduced running stability when such a frame structure is applied to a lawn mower which engages in a grass cutting operation on riverbeds or undulating grassy terrains. The right and left crawler running devices must be wide apart to compensate for the low running stability due to the high center of gravity, but this would result in a large overall size of the working vehicle.

SUMMARY OF THE INVENTION

The object of the present invention is to provide a working vehicle having a low center of gravity while securing a sufficient height above the ground of the space between the right and left crawler running devices.

The above object is fulfilled, according to the present invention, by a frame structure comprising main frames extending longitudinally along right and left sides of a vehicle body, track frames of crawler running devices extending below and along the main frames, respectively, and an oil tank disposed between the main frames for rigidly interconnecting forward positions of the main frames and rigidly interconnecting the track frames.

In the above structure, the large and heavy oil tank is disposed in a low level, which is made possible by rigidly interconnecting the right and left track frames through the oil tank. Thus, the oil tank acts also as a connecting member for interconnecting the main frames and interconnecting the track frames. Such use of the oil tank allows part of frames to be omitted without reducing the strength of the frame structure.

This frame structure may include an engine supporting frame extending between the right and left main frames to allow the engine to be disposed in a free space rearwardly of the oil tank. The engine supporting frame may be connected to the oil tank through a reinforcing beam. Such a frame structure has an increased rigidity, and at the same time achieves efficient use of the free space. A still more efficient use of space may be made by arranging drive units of the running devices in right and left spaces across the reinforcing beam between the oil tank and the engine.

Thus, the present invention may be applied to a working vehicle having crawler running devices for running over undulating grassy terrains or other unleveled grounds, to allow the large and heavy oil tank and engine to be arranged in low levels while securing a sufficient vehicle height. This structure realizes a working vehicle having a low center of gravity for an excellent running stability without increasing spacing between the right and left crawler running devices.

Other features and advantages of the present invention will be apparent from the following description of the preferred embodiment to be had with reference to the drawings.

DETAILED DESCRIPTION OF THE PREFERRED EMBODIMENT

An embodiment of the present invention will be described with reference to the drawings.

Figure 1:
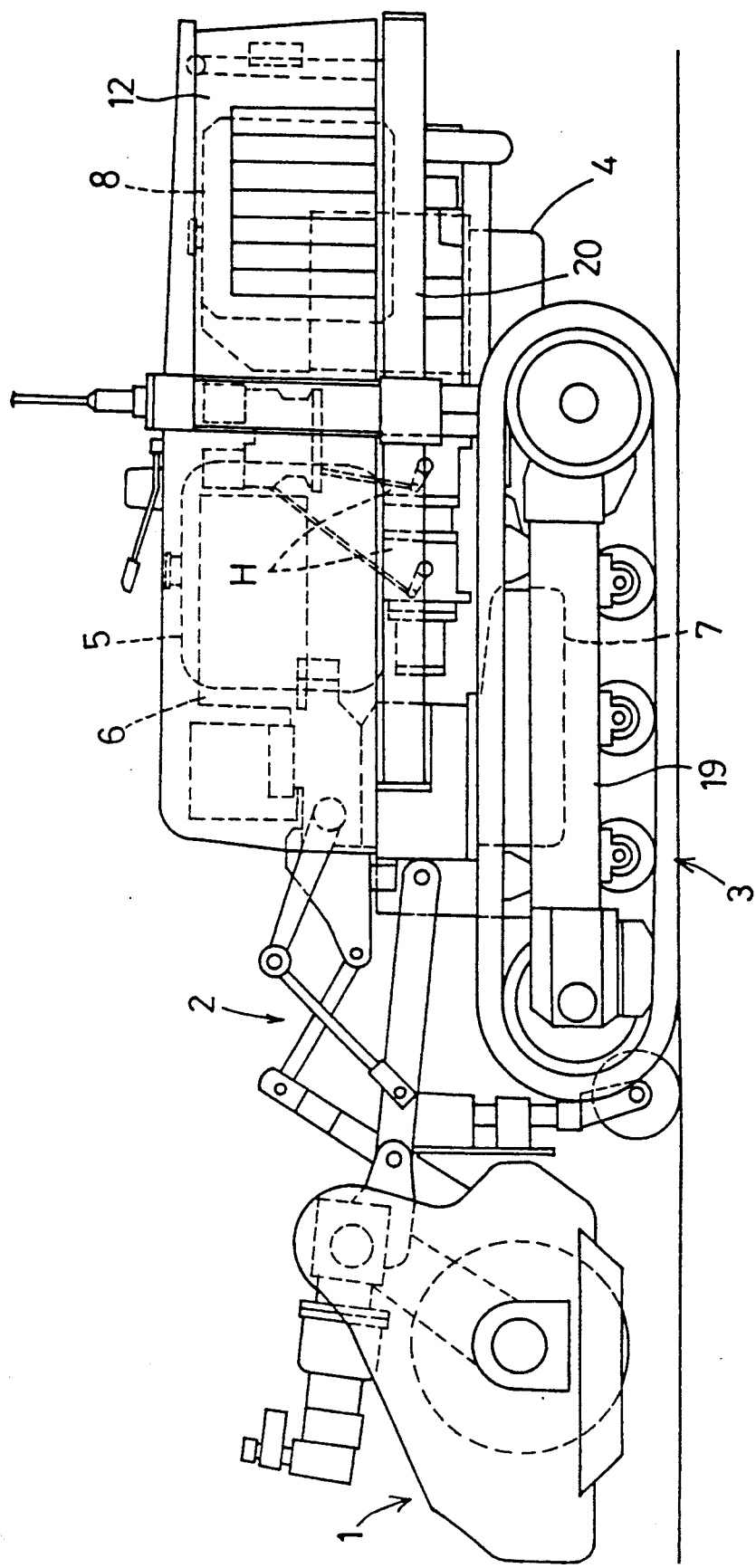
FIG. 1 is a side elevation of a lawn mower.
Figure 2:
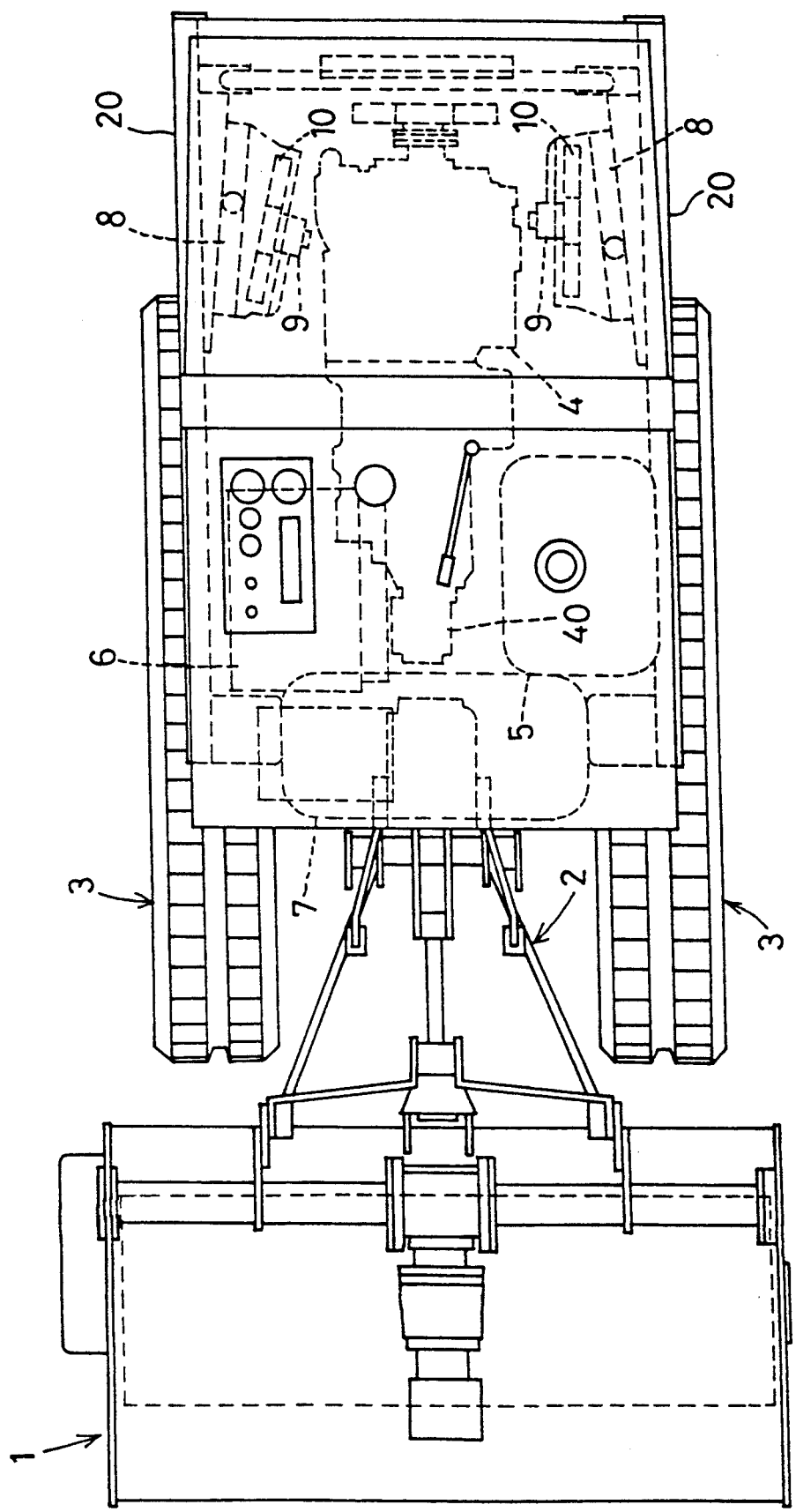
FIG. 2 is a top plan view of the lawn mower.

FIGS. 1 and 2 are a side view and a plan view, respectively, of a lawn mower remote-controlled by radio, which is one example of working vehicles according to the present invention. This lawn mower has a flail mower type grass cutting implement 1 connected to the front of a vehicle body for vertical movement and sideways rolling through a three-point link mechanism 2. The vehicle body has right and left crawler running devices 3, and carries an engine 4 in a rear position of the vehicle body, a fuel tank 5 disposed in a left forward position relative to the engine 4, and a control unit 6 in a right forward position relative to the engine 4.

The crawler running devices 3 are hydraulically driven by hydrostatic stepless transmissions 40, respectively. Rotation of the grass cutting implement 1, and vertical movement and rolling of the link mechanism 2 are all effected by hydraulic drive. A large quantity of pressure oil is required to enable this all hydraulic type drive structure, and a far greater quantity of oil than the required minimum is needed to check temperature increase of the pressure oil. The lawn mower has a large oil tank 7 to store the great quantity of pressure oil. It is an important feature of the present invention to use the oil tank 7 also as part of a body frame structure.

Figure 3:
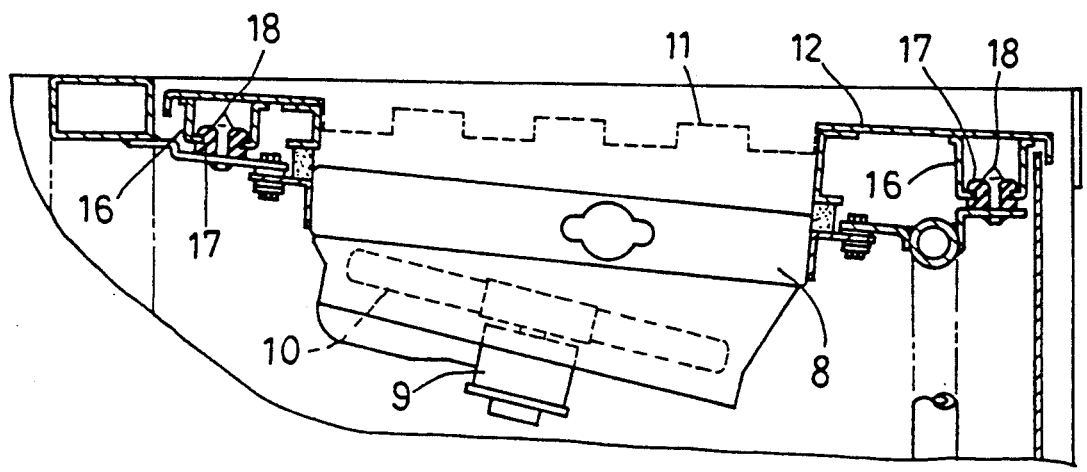
FIG. 3 is a fragmentary plan view of a dust net mounting section.
Figure 4:
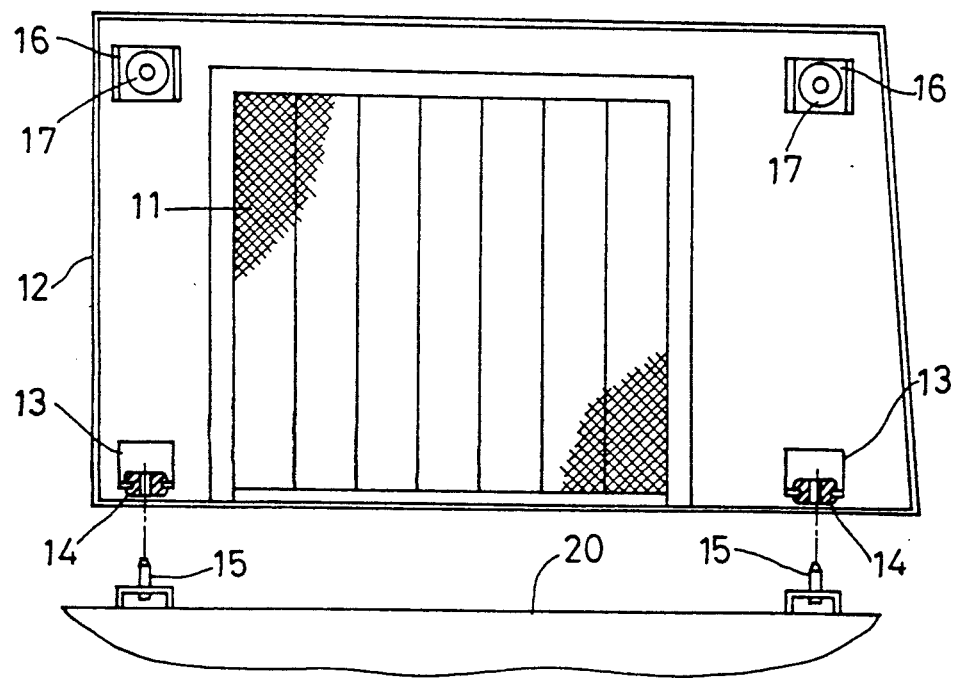
FIG. 4 is a side view of a dust net.

Radiators 8 are disposed at opposite sides of the engine 4 having a forwardly extending output shaft. The radiators 8 are cooled by fans 10 driven by electric motors 9, respectively. Each of the radiators 8 has a dust net 11 secured to a side cover 12 of a motor section including the engine 4. The side cover 12 is removably and elastically supported at two upper and two lower positions thereof by a body frame. Specifically, as shown in FIGS. 3 and 4, the side cover 12 to which the dust net 11 is secured has rubber elements 14 attached through support brackets 13 to lower forward and rearward positions thereof. The rubber elements 14 define vertical through holes therein. The body frame has support pins 14 extending vertically into the through holes of the rubber elements 14, respectively. Further, the side cover 12 has rubber elements 17 attached through support brackets 16 to upper forward and rearward positions thereof. These rubber elements 17 define sideways oriented through holes therein. The body frame has support pins 14 extending sideways into the through holes of the rubber elements 17, respectively. In this way, the side cover 12 is elastically supported to be readily detachable and free of clattering.

Figure 5:
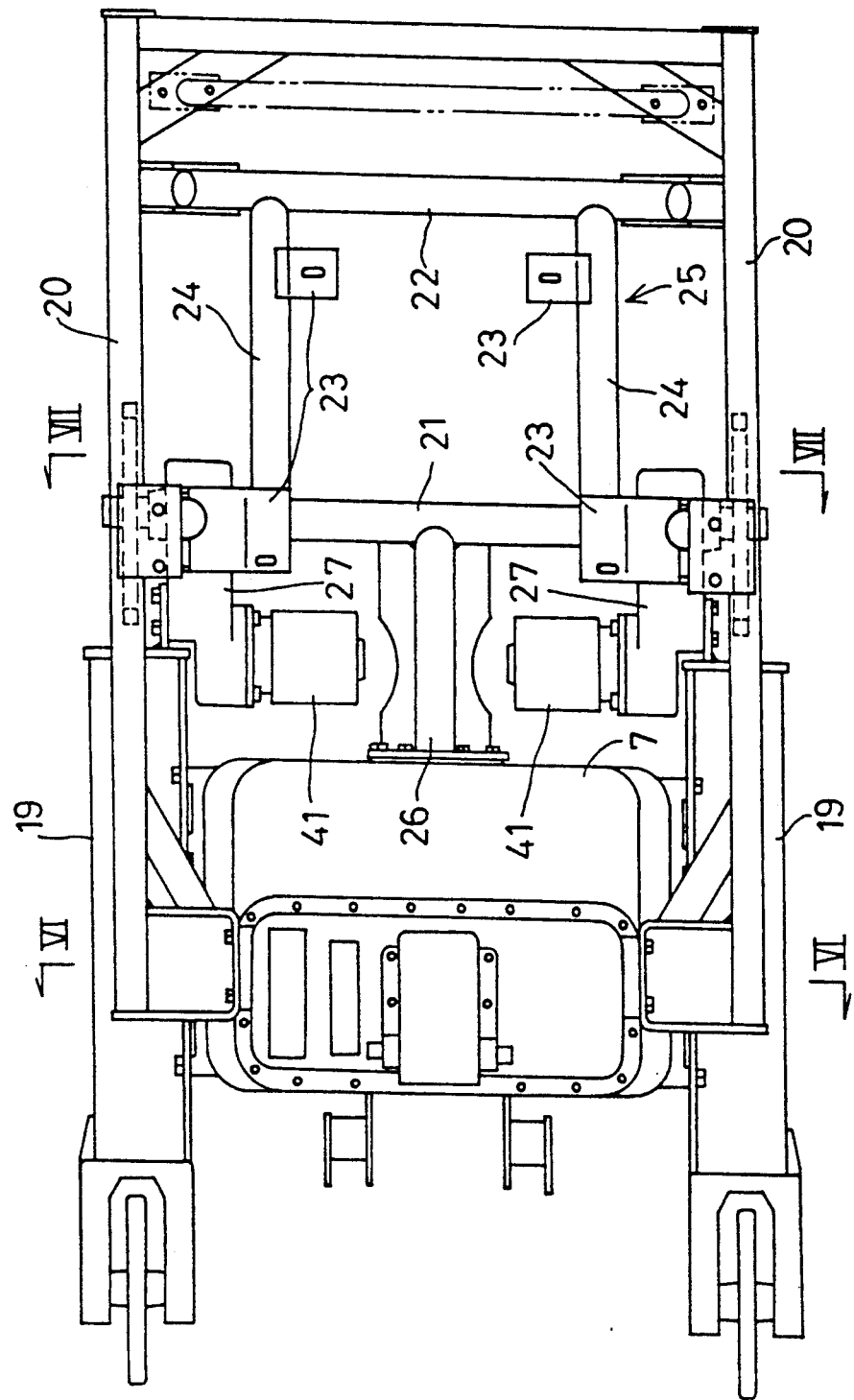
FIG. 5 is a plan view of a frame structure.
Figure 6:
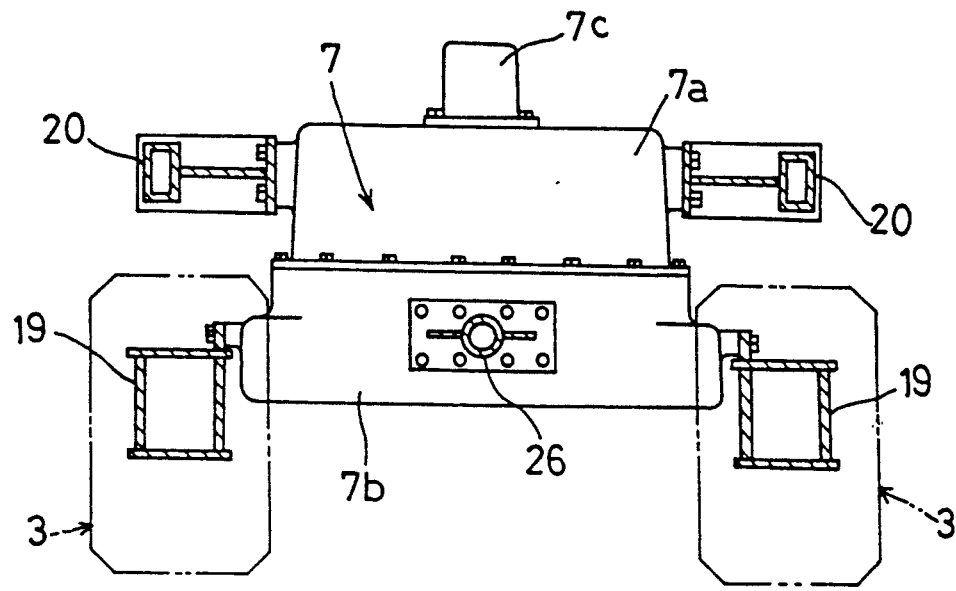
FIG. 6 is a section taken on line VI—VI of FIG. 5.
Figure 7:
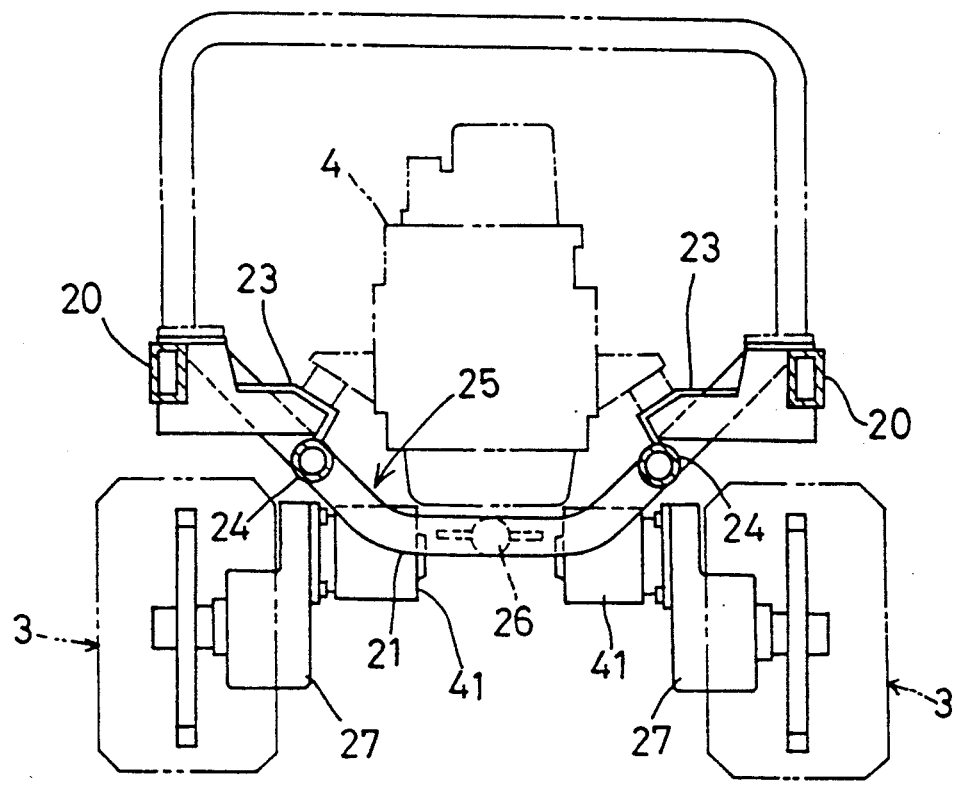
FIG. 7 is a section taken on line VII—VII of FIG. 5.

The body frame structure will be described next. As shown in FIGS. 5 through 7, the oil tank 7 includes an upper tank portion 7a and a lower tank portion 7b, and is located between the right and left crawler running devices 3. The crawler running devices 3 have track frames 19 fixed to opposite lateral positions of the lower tank portion 7b. Body frames 20 extending longitudinally and acting as main frames of the lawn mower are fixed at forward ends thereof to opposite lateral positions of the upper tank portion 7a. Thus, the oil tank 7 acts as a cross beam for the track frames 19 and body frames 20. Further, the upper tank portion 7a has a mounting bracket 7c fixed to a top surface thereof to connect thereto the three-point link mechanism 2 for the grass cutting implement 1. The body frames 20 are interconnected at rearward positions thereof through a pair of forward and rearward connecting beams 21 and 22 curved downwardly in a shape resembling letter U. The respective connecting beams 21 and 22 carry engine support brackets 23 fixed thereto. The connecting beams 21 and 22 are interconnected and reinforced by right and left connecting rods 24 to form an engine supporting framework 25 recessed downwardly. The engine supporting framework 25 is rigidly connected at a center front position thereof to a center rear position of the oil tank 7 through a reinforcing beam 26.

Hydraulic motors 41 and reduction mechanisms 27 for driving the right and left crawler running devices 3 are arranged in spaces rearwardly of the oil tank 7 and laterally of the reinforcing beam 26.

In this way, the heavy and rigid oil tank 7 and engine 4 are arranged between the right and left body frames 20, to realize a body structure having a low center of gravity for steady running while maintaining a sufficient space from the ground between the crawler running devices 3.

In the foregoing embodiment, the oil tank 7 stores the pressure oil for driving the hydraulic devices. This oil tank may be divided into two chambers, one for storing the pressure oil and the other for storing fuel. In this case, the fuel tank 5 mounted in the left forward position of the engine 4 is omitted. Where this frame structure is employed for a working vehicle without hydraulic devices, the oil tank 7 may be adapted for use as the fuel tank 5.

What is claimed is:

1. A frame structure for a working vehicle having crawler running devices, comprising:
   main frames extending longitudinally along right and left sides of a vehicle body,
   track frames supported by said crawler running devices and extending below and along said main frames, respectively, and
   an oil tank disposed between said main frames for rigidly interconnecting forward positions of said main frames and rigidly interconnecting said track frames.

2. A frame structure for a working vehicle having crawler running devices, comprising:
   main frames extending longitudinally along right and left sides of a vehicle body,
   track frames supported by said crawler running devices and extending below and along said main frames, respectively, and
   an oil tank disposed between said main frames for rigidly interconnecting forward positions of said main frames and rigidly interconnecting said track frames, wherein said oil tank includes an upper tank portion connected at one side thereof to one of said main frames and at the other side to the other main frame, and a lower tank portion connected at one side thereof to one of said track frames and at the other side to the other track frame.

3. A working vehicle having hydraulic devices and an engine, comprising:
   main frames extending longitudinally along right and left sides of a vehicle body,
   crawler running devices extending longitudinally through regions below forward portions of said main frames and including track frames, respectively,
   an oil tank disposed between said main frames for rigidly interconnecting forward positions of said main frames and rigidly interconnecting said track frames,
   engine supporting frame means connected to rear positions of said main frames and including at least one cross beam connected at one end thereof to one of said main frames and at the other end to the other main frame, said cross beam being curved downwardly with an intermediate portion thereof lying substantially level with a lower region of said oil tank, and
   a reinforcing beam extending from said intermediate portion of said cross beam longitudinally of the vehicle body and connected to said oil tank.

4. A working vehicle as claimed in claim 3, further comprising drive means for driving said crawler running devices, said drive means being arranged in two sections defined by said cross beam, said oil tank and said reinforcing beam.

5. A working vehicle having a working implement connected to a forward position of a vehicle body, and an engine mounted on a rear position of the vehicle body, comprising:
   main frames extending longitudinally along right and left sides of a vehicle body,
   crawler running devices extending longitudinally through regions below forward portions of said main frames, said crawler running devices including track frames, and drive means for receiving drive from said engine, respectively,
   an oil tank disposed between and supported by said main frames, said oil tank being rigidly connected to said track frames,
   engine supporting frame means connected to rear positions of said main frames and including at least one cross beam connected at one end thereof to one of said main frames and at the other end to the other main frame, said cross beam being curved downwardly with an intermediate portion thereof lying substantially level with a lower region of said oil tank, and a reinforcing beam extending from said intermediate portion of said cross beam longitudinally of the vehicle body and connected to said oil tank, said drive means being arranged in two sections defined by said cross beam, said oil tank and said reinforcing beam.

6. A working vehicle as claimed in claim 5, wherein said oil tank includes an upper tank portion connected at one side thereof to one of said main frames and at the other side to the other main frame, and a lower tank portion connected at one side thereof to one of said track frames and at the other side to the other track frame, said main frames being connected at forward positions thereof to a box-like frame having a bottom surface connected to an upper surface of said oil tank.

7. A working vehicle as claimed in claim 6, wherein said upper tank portion carries a mounting bracket on an upper surface thereof for connecting said working implement.

8. A working vehicle as claimed in claim 5, wherein said engine supporting frame means includes a further cross beam connected to said main frames, and two auxiliary beams extending longitudinally of the vehicle body and bridging said cross beam and said further cross beam.

9. A working vehicle as claimed in claim 8, further comprising forward engine supporting brackets disposed in regions of connection between said cross beam and said main frames, respectively, and rear engine supporting brackets mounted on said auxiliary beams, respectively, said engine extending longitudinally of the vehicle body and mounted on said engine supporting brackets.

10. A working vehicle as claimed in claim 9, further comprising radiators arranged at opposite sides of said engine and extending substantially along said main frames, respectively.

11. A working vehicle having hydraulic devices and an engine, comprising:

main frames extending longitudinally along right and left sides of a vehicle body, crawler running devices extending longitudinally through regions below forward portions of said main frames and including track frames, respectively, a box-like frame disposed between said main frames and interconnecting forward positions thereof, an oil tank disposed between said track frames and rigidly connected to said box-like frame for storing pressure oil to drive said hydraulic devices, said track frames being rigidly interconnected through said oil tank, engine supporting frame means connected to rear positions of said main frames and including at least one cross beam connected at one end thereof to one of said main frames and at the other end to the other main frame, said cross beam being curved downwardly with an intermediate portion thereof lying substantially level with a lower region of said oil tank, and a reinforcing beam extending from said intermediate portion of said cross beam longitudinally of the vehicle body and connected to said oil tank.

* * * * *